March 9, 1943.     A. G. GARZO     2,313,470
FISHING REEL
Filed Dec. 31, 1940     2 Sheets-Sheet 1
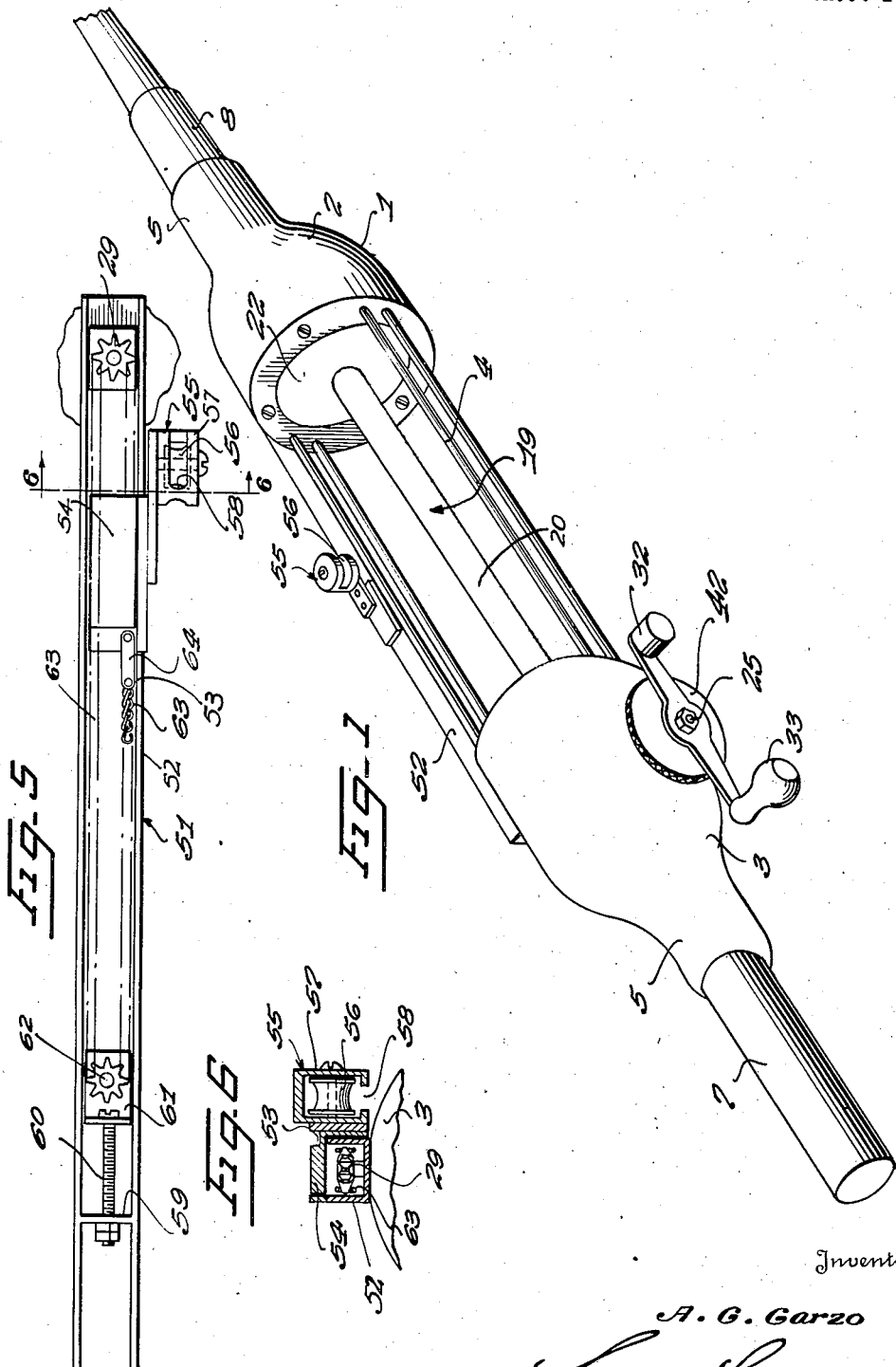
Inventor
A. G. Garzo
By Lacey & Lacey,
Attorneys March 9, 1943.  A. G. GARZO  2,313,470
FISHING REEL
Filed Dec. 31, 1940  2 Sheets-Sheet 2
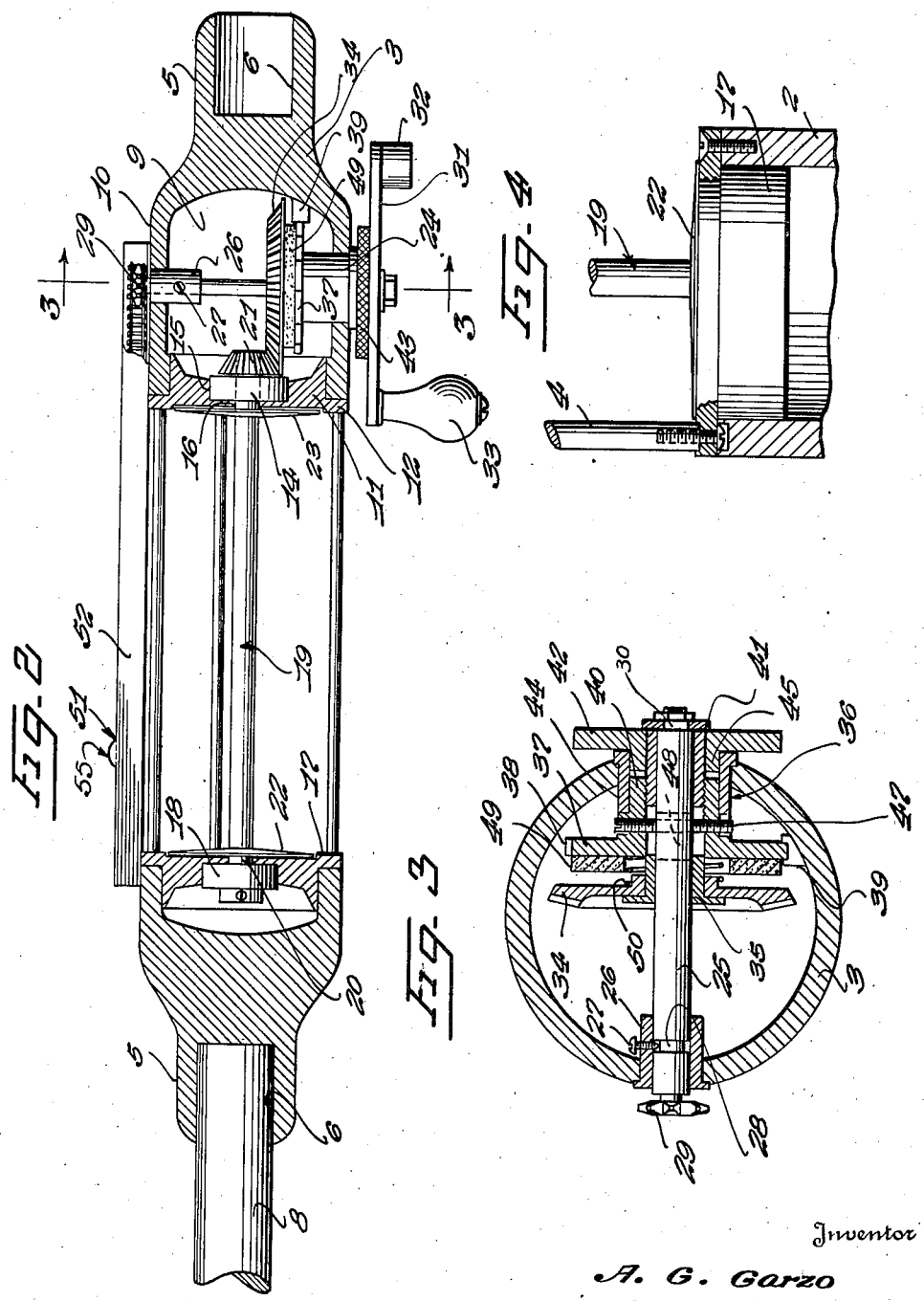
Inventor
A. G. Garzo
By Lacey & Lacey
Attorneys Patented Mar. 9, 1943

2,313,470

UNITED STATES PATENT OFFICE 2,313,470

FISHING REEL

Abraham G. Garzo, West Palm Beach, Fla.

Application December 31, 1940, Serial No. 372,635

2 Claims. (Cl. 242—84.4)

This invention relates to an improved fishing reel.

One object of the invention is to provide a fishing reel which is so constructed that it may be held at a point near the axis at all times, irrespective of the length of line on the spool or the amount of pulling stress exerted on the line.

Another object of the invention is to provide a fishing reel of this character which will be evenly balanced so that effective control of the line under stress may be easily had.

A further object of the invention is to provide a fishing reel which will employ all of the attachments commonly used with conventional reels, such as the clutch, brake, drag, etc., and, in addition, employs an improved level winder which will be far more practical in use than winders constructed up to the present time.

Still another object of the invention is to provide a fishing reel constructed in such a manner that backlash will be reduced to a minimum.

Still another object of the invention is to provide a device of this character wherein the mechanical parts are completely enclosed and will not, therefore, be exposed to the elements.

Still further objects of the invention, not particularly mentioned hereinbefore, will become apparent during the course of the following description.

In the drawings forming a part of my application:

Figure 1 is a perspective view of my improved fishing reel.

Figure 2 is a longitudinal sectional view of the device.

Figure 3 is a transverse sectional view on the line 3—3 of Figure 2 looking in the direction indicated by the arrows.

Figure 4 is an enlarged detail sectional view, partly in elevation, and showing the manner in which one end of the spool is mounted.

Figure 5 is an enlarged detail elevation showing particularly the improved level winder mechanism.

Figure 6 is an enlarged transverse sectional view on the line 6—6 of Figure 5.

Referring now more particularly to the drawings, wherein, as will be seen, like numerals of reference designate like parts throughout the various views, the numeral 1 indicates in general the body of my improved fishing reel. The body 1 includes an outer head 2 and an inner head 3, said heads being connected by pairs of spaced tie rods 4, a pair of said tie rods being disposed in diametrically opposed relation on each side of the heads. The heads 2 and 3 are substantially semi-elliptical in shape and each have projecting integral shanks 5, said shanks being formed with sockets 6. The socket 6 in the shank 5 of the head 3 receives the handle 7, which may be of any desired length. The socket 6 in the shank 5 of the head 2 receives the inner end of the fishing pole, which is indicated for convenience at 8.

The head 3 is recessed to define a hollow interior 9, said hollow interior defining a side wall 10. The head 3 is open at its larger end and said open end is normally closed by means of a plug 11, said plug having a flange 12 through which are extended screws for securing the plug in place in the head.

The plug 11 is formed with an axially disposed bearing 14, said bearing being carried in a recess 15 in the underface of the plug. An opening 16, in alinement with the bearing 14, is formed in the plug.

A plug 17, similar to the plug 11, is carried in the head 2 and closes the open end thereof. The plug 17 carries an axially mounted bearing 18, said bearing being in alinement with the bearing 14. Rotatably mounted within the body 1 and between the heads 2 and 3 is a spool 19, said spool having a shaft 20 which has its opposite ends journaled by the bearings 14 and 18. The shaft 20 carries a pinion 21 which is mounted within the hollow interior 9. The purpose of the pinion will be set forth more in detail hereinafter. The spool 19 has heads or end plates 22 and 23 which are rotatable in recesses formed in the faces of the plugs 11 and 17, in the conventional manner.

It will now be seen that the spool 19 is freely rotatable within the body and between the heads 2 and 3 thereof. In order to transmit rotative movement to the spool and to the level winder mechanism, to be described hereinafter, I provide rotating mechanism which is shown generally at 24 and is mounted within the hollow interior 9 of the head 3. The mechanism is best seen in Figures 2 and 3 of the drawings and, by referring to these figures, it will be seen that said mechanism includes a shaft 25 which extends transversely of the head 3 and projects through the wall 10 at diametrically opposite points thereof. The shaft 25 is journaled at one end by a bearing bushing 26 which carries a locking screw 27, said locking screw being engageable in a groove 28 formed in said shaft 25. Exteriorly of the bearing bushing 26 and the head 3, the shaft 25 carries a sprocket gear 29, the purpose of which will be made evident hereinafter. At its opposite end, the shaft 25 is reduced and squared, as shown at 30, and said reduced and squared portion 30 receives a crank 31, of conventional design. The crank 31 carries a weight 32 and a manually engageable portion 33.

In order to impart rotative movement to the spool 19, I provide a driving gear 34, this gear being of the beveled type and having teeth meshing with the teeth of the pinion 21. The gear 34 is rotatably mounted on a sleeve 35 which is, in turn, mounted to rotate with the shaft 25 so that when the shaft is rotated by movement of the crank 31 and the shaft is clutched to gear 34, the gear 34 will be rotated for imparting rotative movement to the spool 19. As best seen in Figure 1, the crank 31 is positioned at the side of the head 3 for convenient manual engagement with the result that the spool may be rotated in the same manner that the conventional fishing reel spool is actuated.

My improved fishing reel includes drag mechanism which is shown generally at 36. The drag mechanism includes a clutch plate 37 having ratchet teeth 38 on its circumferential edge. The ratchet teeth are engageable with a flexible pawl 39 which is mounted within the hollow interior 9 of the head 3. The pawl is so mounted that the clutch plate will be held against counterclockwise rotation. However, the clutch plate will be allowed to rotate in a clockwise direction during winding, and with the usual clicking sound. As best seen in Figure 3, the pawl is relatively wide so that the plate 37 may be shifted laterally without becoming disengaged therefrom. The clutch plate 37 is provided with an integral internally threaded sleeve 40 which extends toward the wall 10 and in surrounding relation with respect to the shaft 25. Mounted about the shaft between said shaft and the sleeve 40 is an externally threaded shifting sleeve 41, the threads of said shifting sleeve engaging with the threads of the sleeve 40. An operating disc 42 is fixedly mounted on the shifting sleeve and is disposed exteriorly of the head 3. The operating disc is provided with a knurled surface 43 for convenient manual engagement. A guide sleeve 44 is fixedly mounted in the wall 10 of the body 3 in surrounding relation to the sleeves 40 and 41 and the hub 45 of the disc 42. A key bolt 47 is extended through the sleeve 40 and through a slot 48 in the shaft 25. Mounted on the inner face of the clutch plate 37 is a preferably fiber clutch disc 49, said disc having an axial opening to receive the shaft 25 and the sleeve 35. The clutch spring 50 is tensioned between the plate 37 and the gear 34 for maintaining the gear 34 and clutch plate 37 in proper operative relation.

It will now be understood that when the disc 42 is rotated, the shifting sleeve 41 will also be rotated for shifting the sleeve 40 and the clutch plate 37 axially whereby the clutch disc 49 will be engaged with the gear 34. It will now be seen that, when the shaft 25 is rotated, rotative movement will be transmitted from the clutch disc to the gear 34 for rotating the gear and winding a fish line on the spool. The usual clicking sound will be caused by engagement of the member 39 with the ratchet teeth 38. The disc may be tightened or loosened for increasing or lessening the amount of drag on the spool. Rotation of the disc 42 in the opposite direction will, of course, retract the plate 37 for permitting free unwinding of the spool. The sleeve 40 and disc 37 will be limited in their axial movement to the length of the slot 48, due to the fact that the bolt 47 extends through said slot and is anchored at its opposite ends in said sleeve 40.

It should be understood that, when the line has been wound on the spool, said spool will be held against unwinding by the action of the pawl on the ratchet teeth. Unwinding may not take place until the disc 42 is rotated in a counterclockwise direction, when it will be moved away from the gear 34 for freeing said gear to rotate about the sleeve 35. As stated, the disc may be moved into more or less tight engagement with the inner face of the gear 34 for braking or causing drag on the spool. The clutch plate will be held against rotation in counterclockwise direction, of course, during unwinding of the spool, as stated.

My improved level winder mechanism will now be described, said level winder mechanism is best seen in Figures 1, 2, 5 and 6 of the drawings and is indicated generally at 51. The level winder 51 includes a substantially rectangular housing 52 which is mounted on the body 1 and extends between the heads 2 and 3 and partway along the head 3. The housing is provided with a slot 53 which extends throughout substantially the entire length of said housing and slidably receives a finger 54 of a winder carriage 55, said winder carriage carrying a pulley 56 which is mounted in a yoke 57, said yoke being formed with a feed opening 58. As best seen in Figure 2, the housing 52 fits over the end of the shaft 25 so that the sprocket 29 will be disposed within said housing. The opposite end of the housing 52 carries a wall 59, and said wall is apertured to receive an adjusting bolt 60, said adjusting bolt having its head rotatably mounted in a bracket 61 which carries an idler sprocket wheel 62, said idler being in longitudinal alinement with the sprocket wheel 29. A sprocket chain 63 extends continuously between the sprocket wheels 29 and 62 so that when the shaft 25 is rotated, the sprocket wheel 29 will cause the chain to run continuously and freely about the sprocket wheels within the housing 51. The finger 54 is operatively connected with a link of the chain 63 by means of a lug 64 which may be bent slightly if necessary. It will now be understood that, by means of the lug 64, movement of the chain will impart reciprocating movement of the carriage within the housing 52. The carriage will thus move backwards and forwards along the housing in confronting relation to the spool 19 with the result that the even winding or unwinding of a fishing line will be assured. Tightening or loosening of the bolt 60 will control the tension of the chain 63 about the wheels 29 and 62.

While it is believed that the operation of my improved fishing reel will be understood from the foregoing, it is thought that a brief summary will not be out of place.

It is, of course, assumed that the handle 7 which is mounted in the socket 6 of the shank 5 of the head 3 is of a length for convenient manual engagement, also it is assumed that the rod 8 is of the desired length for the particular type of fishing to be done. The fishing line is evenly wound about the shaft of the spool 19 between the end plates 22 and 23 thereof. It may be stated that the level winder mechanism will greatly facilitate initial winding of the fishing line on the spool. The end of the fishing line is trained partially about the pulley 56 in the yoke 55. Thence, the fishing line is trained through the eyes which are conventionally mounted at spaced points along the rod 8. The end of the fishing line, of course, carries the usual hook, fly, or other fish attracting device.

After the fishing line has been baited and unreeled to the desired length and the line is struck by a fish, said line will be permitted to unwind as the fish fights the hook and attempts to escape. The amount of line and speed of discharge of the line may be effectively controlled by regulation of the tension of the drag, as hereinbefore described.

It is desired to emphasize that, by the use of my improved fishing reel, backlash will be practically eliminated. This is due to the small diameter of the reel as compared to reels of conventional design. At the same time, it will be possible to reel larger game fish in with greater facility than with the fishing reels constructed up to the present time.

The improved level winder mechanism I employ, using the sprocket and chain structure, will require little or no oiling and will be rugged and long lasting in service. My improved fishing reel has all of the advantages of reels now in use with the added advantage of the improved level winder mechanism and also greatly improved balance.

My improved fishing reel may be made in several different sizes for use with practically all kind of fishing. The parts are enclosed so that water, dirt and other extraneous matter will not be permitted to interfere with proper operation.

It is believed that further description is unnecessary.

Having thus described the invention, what is claimed as new is:

1. In a fishing reel, a body including a pair of heads, a spool carried by the body between the heads, a level winder mechanism carried by the body and extending between the heads, means carried by one of said heads and operable for imparting rotative movement to the spool and simultaneously operating the level winder mechanism whereby winding of line upon the spool throughout its length will be assured, said level winder mechanism including a housing, a carriage slidable longitudinally of the housing, a pair of sprocket wheels, a sprocket chain trained about the wheels, and means operatively connecting the carriage with the sprocket chain.

2. In a fishing reel, a body including a pair of heads, a spool carried by the body between the heads, a shaft rotatably mounting the spool within the body and extending into one of said heads, a pinion carried on said shaft, a shaft carried by said last-mentioned head, a gear carried by said second-mentioned shaft and meshing with the pinion, a crank connected with the second mentioned shaft for rotating the shaft and gear for imparting rotative movement to the spool, a level winder mechanism including a housing extending between the heads, said second mentioned shaft extending into the housing, a carriage longitudinally moveable along the housing between the heads, a sprocket wheel carried by the second-mentioned shaft within the housing, an idler sprocket wheel carried by the housing near its opposite end, a sprocket chain trained about the sprocket wheels within the housing, and means operatively connecting the carriage with the sprocket chain, said first-mentioned sprocket wheel being rotatable upon rotation of the second-mentioned shaft for reciprocating the carriage on the housing whereby winding of fishing line upon the spool throughout its length will be assured.

ABRAHAM G. GARZO.